(12) United States Patent
Azakami

(10) Patent No.: US 11,258,916 B2
(45) Date of Patent: Feb. 22, 2022

(54) ELECTRONIC DEVICE AND COMPUTER-READABLE NON-TRANSITORY RECORDING MEDIUM STORING PROGRAM

(71) Applicant: KYOCERA Document Solutions Inc., Osaka (JP)

(72) Inventor: Kenzo Azakami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/189,439

(22) Filed: Mar. 2, 2021

(65) Prior Publication Data

US 2021/0281705 A1    Sep. 9, 2021

(30) Foreign Application Priority Data

Mar. 4, 2020 (JP) .............................. JP2020-036496

(51) Int. Cl.
*H04N 1/00* (2006.01)

(52) U.S. Cl.
CPC ..... *H04N 1/00938* (2013.01); *H04N 1/00344* (2013.01); *H04N 2201/0094* (2013.01)

(58) Field of Classification Search
CPC ........... H04N 1/00938; H04N 1/00344; H04N 2201/0094

USPC ........................................................ 358/1.13
See application file for complete search history.

(56) References Cited

U.S. PATENT DOCUMENTS

| | | | |
|---|---|---|---|
| 2007/0038946 A1* | 2/2007 | Grieshaber | H04N 1/0097 715/762 |
| 2015/0373223 A1* | 12/2015 | Furushige | H04N 1/00347 358/1.13 |
| 2016/0014292 A1* | 1/2016 | Furushige | H04N 1/00941 358/1.13 |
| 2017/0223208 A1* | 8/2017 | Okamoto | G06F 8/61 |

FOREIGN PATENT DOCUMENTS

WO    2015/182303    12/2015

* cited by examiner

*Primary Examiner* — Neil R McLean
(74) *Attorney, Agent, or Firm* — Lex IP Meister, PLLC

(57) ABSTRACT

An image forming device includes a data collection service and a mail transmission service as extension services for providing a function other than a standard function of the image forming device to an extension application, and an extension service management unit for managing the data collection service and the mail transmission service. When the state of one of a plurality of extension services changes, a service activation control unit of the extension service management unit notifies the other of the plurality of extension services of the change. When the extension service is notified of the change in the state of the other extension service from the service activation control unit, the extension service executes a specific operation.

2 Claims, 9 Drawing Sheets

FIG. 4

340 SERVICE MANAGEMENT INFORMATION TABLE

| 341 EXTENSION SERVICE ID | 342 SERVICE TYPE | 343 AVAILABLE MEMORY SIZE | 344 ACCESS AUTHORITY |
|---|---|---|---|
| . . . | . . . | . . . | . . . |
| 0 1 2 3 4 5 6 | EXTENSION FUNCTION SERVICE | | |
| 0 1 2 3 4 5 7 | BACK-END SERVICE | | |
| . . . | . . . | . . . | . . . |

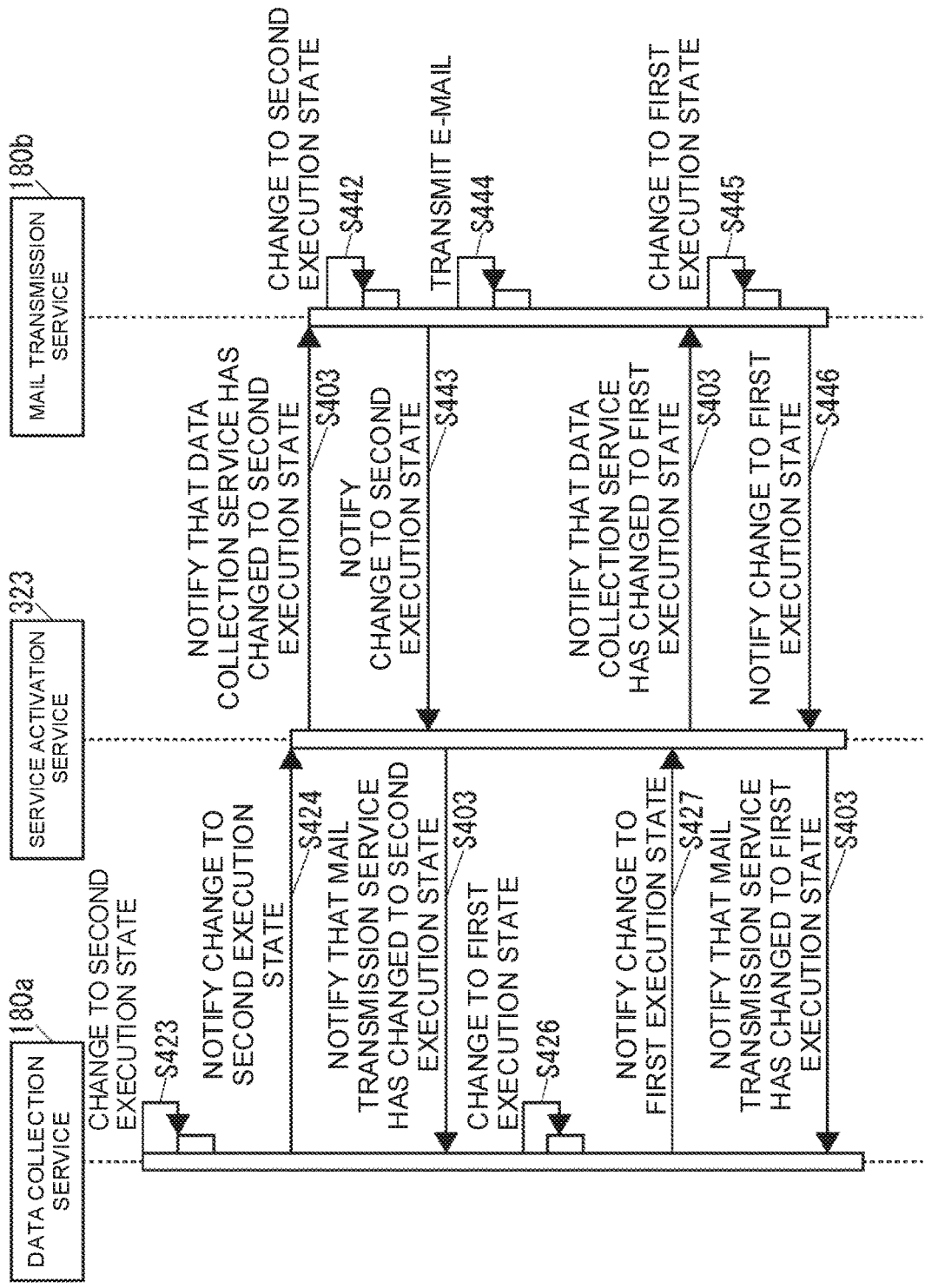

ELECTRONIC DEVICE AND COMPUTER-READABLE NON-TRANSITORY RECORDING MEDIUM STORING PROGRAM

INCORPORATION BY REFERENCE

This application is based upon, and claims the benefit of priority from, corresponding Japanese Patent Application No. 2020-036496 filed in the Japan Patent Office on Mar. 4, 2020, the entire contents of which are incorporated herein by reference.

BACKGROUND

Field of the Invention

The present disclosure relates to an electronic device and a computer-readable non-transitory recording medium storing a program which can execute a standard function and a function other than the standard function.

Description of Related Art

As a typical electronic device, there has been known an image forming device, which has a standard application which is an application realizing a standard function of an image forming device, an extension application which is an application realizing a function other than the standard function of the image forming device, and an extension function service which provides an extension function of the standard function of the image forming device to the extension application without using the standard application.

SUMMARY

An electronic device of the present disclosure includes a first extension service and a second extension service which provide, to an extension application which is an application for realizing a function other than a standard function of the electronic device, the function other than the standard function without using a standard application which is an application for realizing the standard function, and an extension service management unit which manages the first extension service and the second extension service. The extension service management unit notifies the second extension service of a change in the state of the first extension service when the state of the first extension service changes and the second extension service executes a specific operation when the change in the state of the first extension service is notified from the extension service management unit.

A computer-readable non-temporary recording medium of the present disclosure stores a program. The program causes an electronic device to realize a first extension service and a second extension service which provide, to an extension application which is an application for realizing a function other than a standard function of the electronic device, the function other than the standard function without using a standard application which is an application for realizing the standard function, and an extension service management unit which manages the first extension service and the second extension service. The extension service management unit notifies the second extension service of a change in the state of the first extension service when the state of the first extension service changes and the second extension service executes a specific operation when the change in the state of first extension service is notified from the extension service management unit.

BRIEF DESCRIPTION OF THE DRAWINGS

FIG. 4 is a diagram illustrating an example of information set in a service management information table illustrated in FIG. 3;

FIG. 9 is a sequence diagram of the operation of the image forming device illustrated in FIG. 2 when the data collection service operates in corporation with the mail transmission service.

DETAILED DESCRIPTION

Hereinafter, embodiments of the present disclosure will be described with reference to the drawings.

First, the configuration of an image forming device as an electronic device according to the embodiment of the present disclosure will be described.

Figure 1:
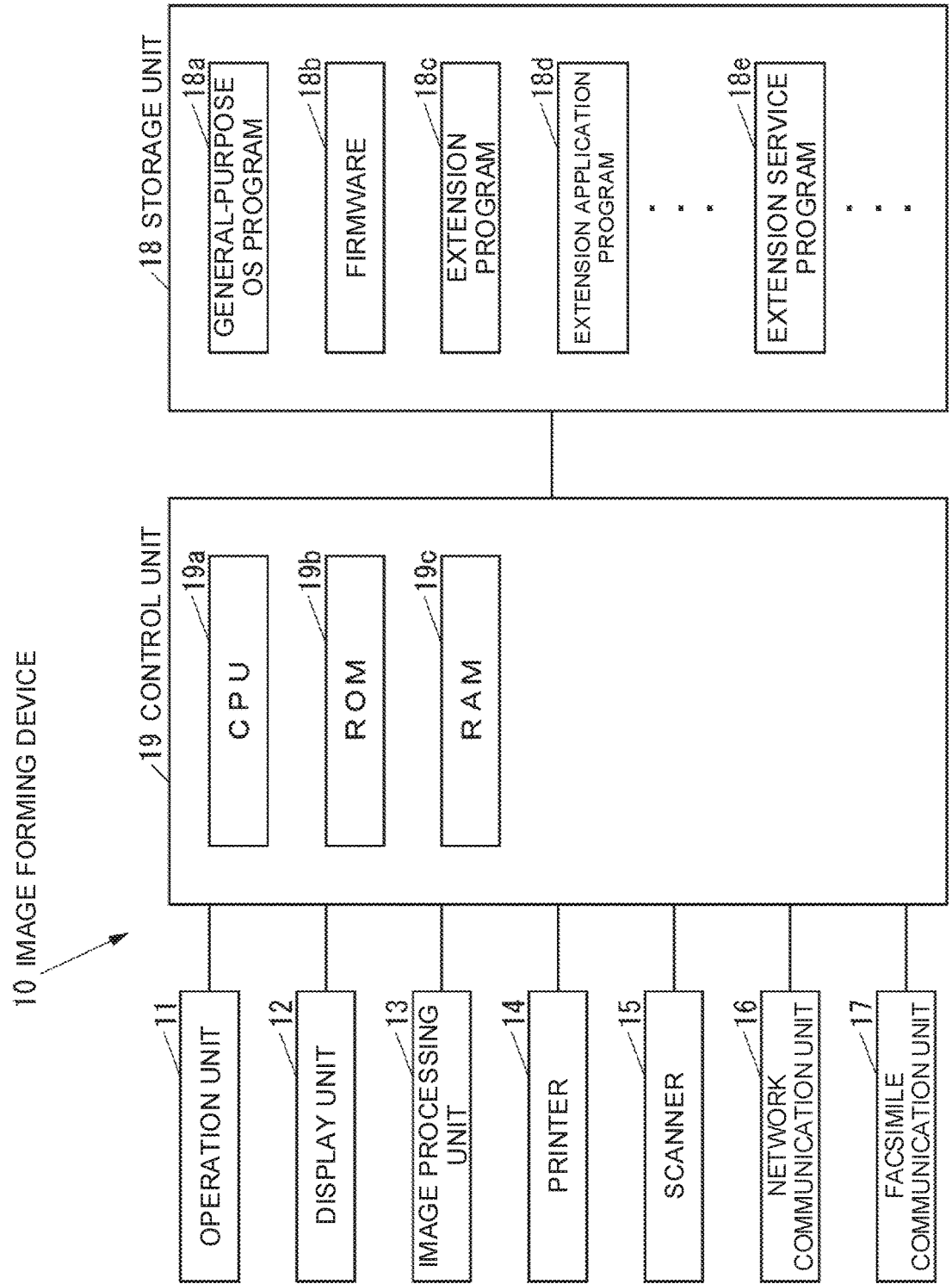
FIG. 1 is a block diagram of hardware of an image forming device according to an embodiment of the present disclosure.

FIG. 1 is a block diagram of hardware of an image forming device 10 according to the present embodiment.

As illustrated in FIG. 1, the image forming device 10 includes an operation unit 11 which is an operation device such as a button to which various operations are input, a display unit 12 which is a display device such as a liquid crystal display (LCD) to which various information is displayed, and an image processing unit 13 which is an image processing device such as a graphics processing unit (GPU) to execute various image processing such as enlargement, reduction, density adjustment, gradation adjustment, and image improvement to image data. The image forming device 10 further includes a printer 14 which is a printing device for printing an image on a recording medium such as paper, a scanner 15 which is a reading device for reading an image from a document, and a network communication unit 16 which is a communication device for communicating with an external device via a network such as a local area network (LAN) or the Internet, or directly by wire or wireless without using the network. The image forming device 10 further includes a facsimile communication unit 17 which is a facsimile device that performs facsimile communication with an external facsimile device not illustrated via a communication line such as a public telephone line, a storage unit 18 which is a nonvolatile storage device such as a semiconductor memory or a hard disk drive (HDD) for storing various kinds of information, and a control unit 19 which controls the entire image forming device 10. The image forming device 10 is, for example, a multifunction peripheral (MFP).

The storage unit 18 stores a general-purpose operating system (OS) program 18a (hereinafter referred to as "general-purpose OS program") such as Linux (registered trademark) for controlling each hardware of the image forming device 10.

The storage unit 18 stores firmware 18b of the image forming device 10.

The storage unit 18 stores an extension program 18c which is a program for realizing a function other than a standard function of the image forming device 10.

The storage unit 18 stores a program for an extension application (hereinafter referred to as "extension application program") 18d, which is an application for realizing a function other than the standard function of the image forming device 10. The storage unit 18 can store the extension application program for each extension application.

The storage unit 18 stores a program for an extension service (hereinafter referred to as "extension service program") 18e for providing a service using the general-purpose OS to the extension application without using the standard application which is an application for realizing the standard function of the image forming device 10. The storage unit 18 can store the extension service program for each extension service.

The control unit 19 includes, for example, a central processing unit (CPU) 19a, a read only memory (ROM) 19b storing a program and various kinds of data, and a random access memory (RAM) 19c as a memory used as a work area for the CPU 19a. The CPU 19a executes a program stored in the storage unit 18 or the ROM 19b.

Figure 2:
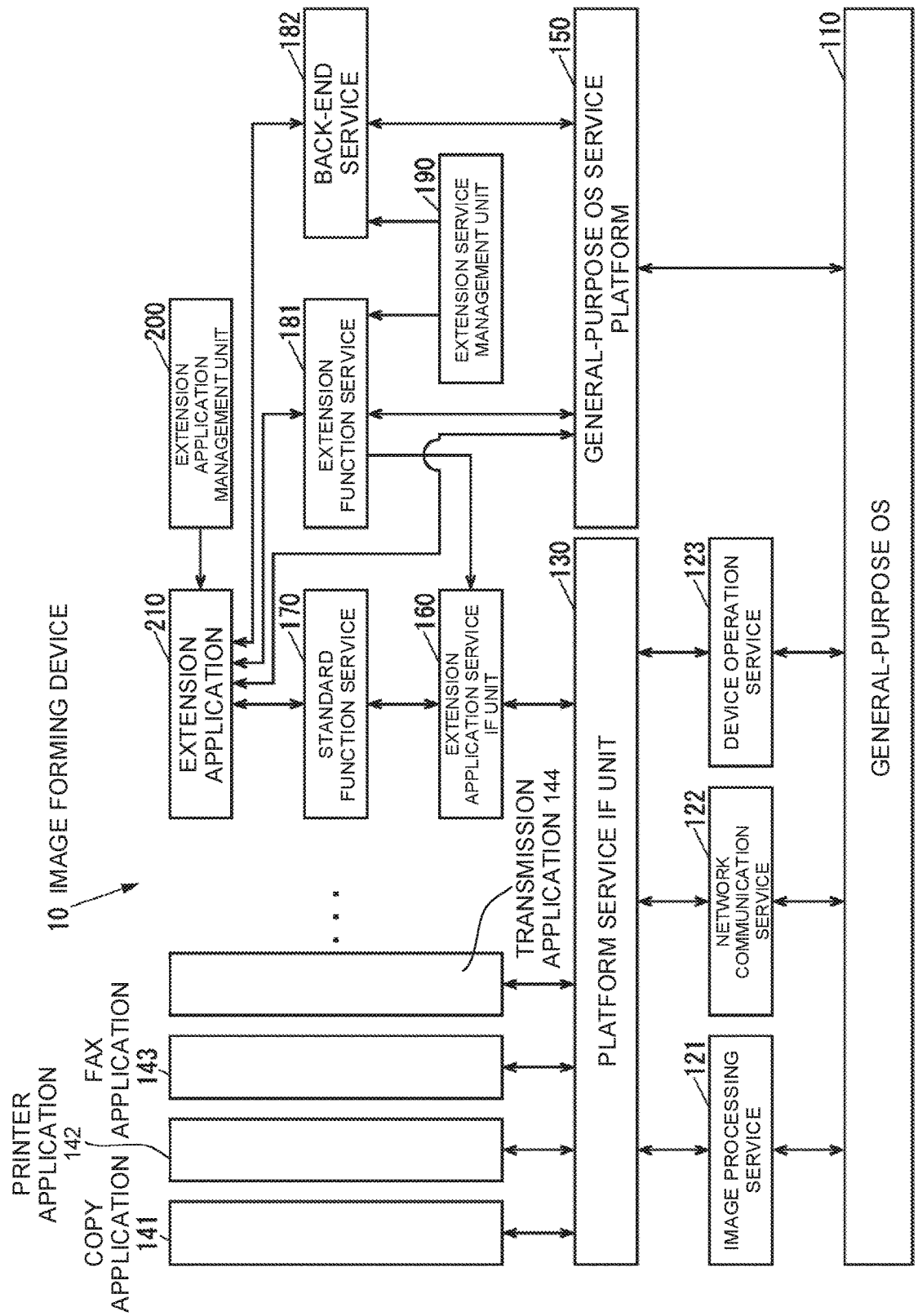
FIG. 2 is a block diagram illustrating a control configuration of the image forming device illustrated in FIG. 1.

The control unit 19 realizes the control configuration illustrated in FIG. 2 by executing a program stored in the storage unit 18 or the ROM 19b.

FIG. 2 is a block diagram illustrating a control configuration of the image forming device 10.

As illustrated in FIG. 2, the control unit 19 realizes a general-purpose OS 110 by executing the general-purpose OS program 18a (see FIG. 1).

The control unit 19 executes the firmware 18b (see FIG. 1) to realize an image processing service 121 that operates on the general-purpose OS 110 and provides a service related to image processing, a network communication service 122 that operates on the general-purpose OS 110 and provides a service related to the communication via the network, and a device operation service 123 that operates on the general-purpose OS 110 and provides a service for operating each hardware of the image forming device 10. Each of the image processing service 121, the network communication service 122, and the device operation service 123 controls each hardware of the image forming device 10 via the general-purpose OS 110.

The image processing service 121 may provide, for example, a service for setting resolution, color, and the like with the scanner 15, storing image data read from a document into the storage unit 18, and causing the image processing unit 13 to perform image processing to image data stored in the storage unit 18. The image processing service 121 may provide a service for drawing image data to be printed by the printer 14 based on a file. The image processing service 121 may provide a service for executing image processing such as enlargement, reduction, rotation, color conversion, noise removal, format conversion, character recognition, and watermark recognition on image data acquired from the extension application, image data read from a document by the scanner 15, or image data stored in the storage unit 18.

The network communication service 122 may provide a service for executing file transmission and reception, streaming, and authentication data transmission and reception via the network communication unit 16 using various protocols such as TCP/IP and UDP. For example, the network communication service 122 can transmit and receive image data read from a document by the scanner 15 and a file stored in the storage unit 18. Note that the network communication service 122 can execute transmission and reception of image data transmitted or received by facsimile by the facsimile communication unit 17, transmission and reception of the result of user authentication by an user authentication unit when the image forming device 10 has the user authentication unit that authenticates the user by IC card or biometric authentication, transmission and reception of image data generated by a camera when the image forming device 10 has the camera, and the like. The network communication service 122 can also transmit and receive the status of each part of the image forming device 10, the result of calling the function of each part of the image forming device 10, and the like.

The device operation service 123 may provide a service for executing processing such as drawing on the display unit 12, driving the printer 14, controlling the facsimile communication unit 17, user authentication, and obtaining the status of each hardware of the image forming device 10. The device operation service 123 may provide, for example, a service for storing image data read from a document by the scanner 15 into the storage unit 18. The device operation service 123 may also provide a service for rendering an image on a browser displayed on the display unit 12. The device operation service 123 may also provide a service for transmitting image data to the printer 14 to form an image. The device operation service 123 may also provide a service for causing the facsimile communication unit 17 to execute facsimile transmission to transmit image data stored in the storage unit 18. The device operation service 123 may provide a service for causing an optional equipment to perform processing such as bookbinding and stapling when the image forming device 10 has the optional equipment such as a finisher. The device operation service 123 may also provide a service for causing a user authentication unit to perform user authentication when the image forming device 10 has the user authentication unit that authenticates a user by IC card or biometric authentication. The device operation service 123 may also provide a service for causing a camera to generate video data and calling each function such as line-of-sight detection based on the video data generated by the camera when the image forming device 10 has the camera. The device operation service 123 may provide a service for executing detailed control of each hardware of the image forming device 10, such as driving one of motors in a conveyance unit of the printer 14. The device operation service 123 may provide a service for acquiring the state of each part of the image forming device 10.

The control unit 19 executes the firmware 18b to realize a platform service IF unit 130, which provides an interface for calling the image processing service 121, the network communication service 122, and the device operation service 123.

The control unit 19 realizes the standard application by executing the firmware 18b. The standard application operates on the platform service IF unit 130 and utilizes each hardware of the image forming device 10. For example, the control unit 19 realizes a copy application 141 which is a standard application for reading an image from a document by the scanner 15 in response to an instruction input to the operation unit 11, and realizing a copy to print the read image by the printer 14. The control unit 19 further realizes a printer application 142 which is a standard application for printing, by the printer 14, an image based on data received by the network communication unit 16 such as data described in a page description language (PDL). The control unit 19 further realizes a facsimile application 143, which is a standard application for reading an image from a document by the scanner 15 in accordance with an instruction input to the operation unit 11 and transmitting the read image by the facsimile communication unit 17. The control unit 19 further realizes a transmission application 144 which is a standard application for reading an image from a document by the scanner 15 in accordance with an instruction input to the operation unit 11 and transmitting the read image by the network communication unit 16. The printer application 142 may print an image based on a file stored in the storage unit 18 by the printer 14 in response to an instruction input to the operation unit 11. The facsimile application 143 may transmit an image based on the file received by the network communication unit 16 by the facsimile communication unit 17. The facsimile application 143 may further print the image received by the facsimile communication unit 17 by the printer 14. The facsimile application 143 may further store the image received by the facsimile communication unit 17 into the storage unit 18.

The control unit 19 realizes a general-purpose OS service platform 150 which provides a service using the general-purpose OS 110 without intervening the platform service IF unit 130 by executing the extension program 18c (see FIG. 1). The general-purpose OS service platform 150 may provide a service for adding a function to the general-purpose OS 110, for example, such as installing a control program such as a device driver or a script into the general-purpose OS 110.

The control unit 19 realizes an extension application service IF unit 160 that provides an interface for using the platform service IF unit 130 from the extension application side by executing the extension program 18c.

The control unit 19 realizes a standard function service 170, which is a service for providing the standard function of the image forming device 10 to the extension application by using the standard application, by executing the extension program 18c. The standard function service 170 uses the standard application via the extension application service IF unit 160. For example, the extension application can display the start screen for copying by the copy application 141 on the display unit 12 by using the standard function service 170. Further, by using the standard function service 170, the extension application can cause the printer application 142 to print various kinds of job data, file or the like acquired by the extension application itself or specified through the operation unit 11. Further, by using the standard function service 170, the extension application can acquire image data designated via the operation unit 11 among the facsimile image data received by the facsimile application 143, or cause the facsimile application 143 to transmit a file or the like designated via the operation unit 11.

The control unit 19 executes an extension service program (see FIG. 1) to realize an extension service, which is a service providing a function other than the standard function of the image forming device 10. For example, the control unit 19 realizes an extension function service 181, which is an extension service for providing, to the extension application, a service for using the platform service IF unit 130 without using any standard application or for using the general-purpose OS 110 by using the general-purpose OS service platform 150. The control unit 19 further realizes a back-end service 182, which is an extension service for providing, to the extension application, a service using the general-purpose OS 110 by using the general-purpose OS service platform 150 without using the platform service IF unit 130. The extension function service 181 uses the platform service IF unit 130 via the extension application service IF unit 160. The control unit 19 can realize at least one extension function service other than the extension function service 181. The control unit 19 can realize at least one back-end service other than the back-end service 182.

The extension function service is a service that provides an extension function of the standard function of the image forming device 10 to the extension application.

The back-end service is a service that runs on the back-end. The back-end service is a service that provides a function other than the extension function of the standard function of the image forming device 10 among functions other than the standard function of the image forming device 10. The back-end service is, for example, a service providing a function of monitoring the image forming device 10, a service providing a function of monitoring the entire system composed of a plurality of image forming devices, and a service providing a function of monitoring a specific server. Further, the back-end service is, for example, a service providing a function of collecting information such as a counter indicating the number of printed sheets of the image forming device 10 from the image forming device 10 and converting the collected information into information in a format that can be understood by a human, and a service that provides a function of converting the format of information output from the image forming device 10 from an old type interface format to a new type interface format.

The control unit 19 executes the extension program 18c to realize an extension service management unit 190 which manages the extension service such as activating, initiating, and stopping the extension service. The extension service management unit 190 monitors the state of the extension service and the general-purpose OS service platform 150.

The control unit 19 executes the extension program 18c to realize an extension application management unit 200 which manages the extension application such as activating, initiating, and stopping the extension application.

The control unit 19 realizes an extension application 210 by executing the extension application program 18d (see FIG. 1). Note that the control unit 19 can realize at least one extension application other than the extension application 210. The extension application is an application that a user directly uses, and has a user interface. The user can use the function provided by the extension application by operating the user interface of the extension application. For example, the extension application may be a practical application for an optical character recognition (OCR), a surveillance camera application, a watermark creation, an invoice creation, an employee list management, a slip management, a contract management, a business card management, a PDF creation, a book management, a group management, and the like. The extension application may also be an installer application that executes to add or change a device driver and firmware on the general-purpose OS 110, or other management applications. The extension application can call the standard function service 170, and use the general-purpose OS 110 by using the standard application. The extension application can also call the extension service, and use the general-purpose OS 110 without using any standard application. The extension application can also use the general-purpose OS 110 by directly calling the general-purpose OS service platform 150.

Figure 3:
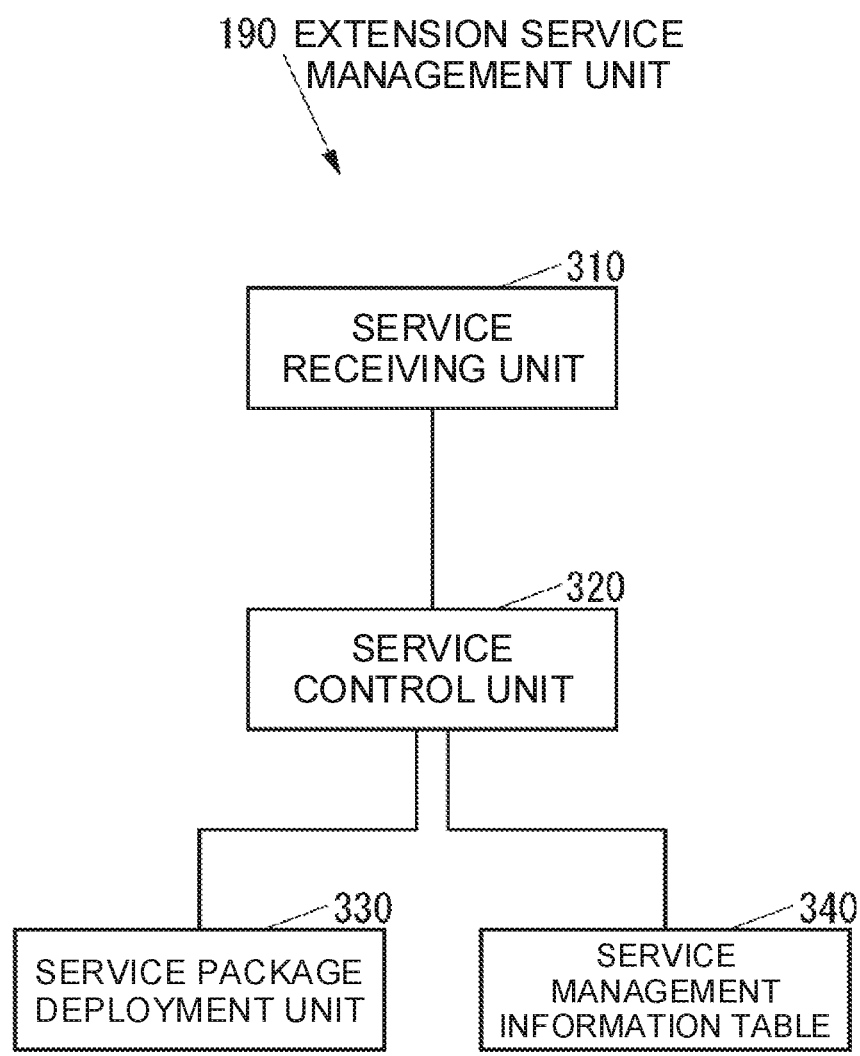
FIG. 3 is a diagram illustrating a configuration of an extension service management unit illustrated in FIG. 2.

FIG. 3 is a diagram illustrating the configuration of the extension service management unit 190.

As illustrated in FIG. 3, the extension service management unit 190 includes a service receiving unit 310 for receiving a request for processing to add a new extension service to the image forming device 10, and a request for processing responsive to an operation, for example, for updating or deleting to an existing extension service in the image forming device 10. The extension service management unit 190 further includes a service control unit 320 for executing processing responsive to a request received by the service receiving unit 310. The extension service management unit 190 further includes a service package deployment unit 330 for placing a software package for the extension service to newly add to the image forming device 10 at a specific location in the storage unit 18 in response to an instruction from the service control unit 320. The extension service management unit 190 further includes a service management information table 340 indicating information on the extension service. For example, when a new extension service is added to the image forming device 10, the service control unit 320 sets information for the extension service in the service management information table 340.

FIG. 4 is a diagram illustrating an example of information set in the service management information table 340.

As illustrated in FIG. 4, the service management information table 340 registers an extension service ID 341 which is identification information of the extension service, a service type 342 which indicates whether the extension service is the extension function service or the back-end service, an available memory size 343 which indicates the size on the RAM 19c in which the extension service is available, and an access authority 344 which indicates an access authority of the extension service to each part of the control configuration of the image forming device 10 or the storage unit 18 such as each standard application in association with one another. Note that, in FIG. 4, the specific value of the available memory size and the specific value of the access authority are omitted.

Figure 5:
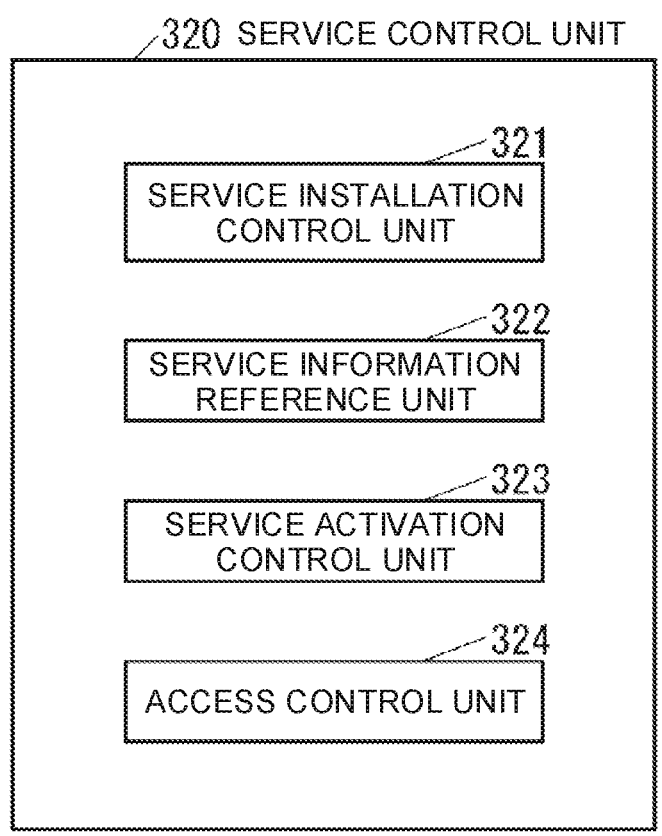
FIG. 5 is a diagram illustrating a configuration of a service control unit illustrated in FIG. 3.

FIG. 5 is a diagram illustrating the configuration of the service control unit 320.

As illustrated in FIG. 5, the service control unit 320 includes a service installation control unit 321 for adding a new extension service to the image forming device 10, and a service information reference unit 322 for referring to information of the extension service in the service management information table 340. The service control unit 320 further includes a service activation control unit 323 for activating the extension service, and an access control unit 324 for restricting the access to the extension service to each part of the control configuration of the image forming device 10, the storage unit 18 and the like.

The service activation control unit 323 manages the states of a standby state, an execution state, a temporary stop state, and the like, for each extension service, for example. Note that, in the case of the execution state, the extension service can transition states between a plurality of sub statuses that are more detailed states of the execution state. The sub status includes, for example, a first execution state and a second execution state.

When the extension service is activated, the service activation control unit 323 acquires the available memory size of the extension service from the service management information table 340 via the service information reference unit 322, and notifies the general-purpose OS 110 that the acquired available memory size is assigned to the extension service. Then, when the extension service is executed, the general-purpose OS 110 manages the available memory size notified from the service activation control unit 323 to be assigned to the extension service so that the extension service does not exceed the available memory size. Therefore, although the image forming device 10 can easily add the extension service, the image forming device 10 can reduce the possibility that the extension service delays the execution of the standard function of the image forming device 10.

For example, when the extension service is activated, the access control unit 324 acquires the access authority of the extension service from the service management information table 340 via the service information reference unit 322, and notifies the general-purpose OS 110 that the access of the extension service to each part of the control configuration of the image forming device 10, the storage unit 18, and the like is restricted according to the acquired access authority. Then, when the extension service is executed, the general-purpose OS 110 restricts the access of the extension service according to the content notified to the extension service from the access control unit 324. Therefore, although the image forming device 10 can easily add the extension service, the image forming device 10 can reduce the possibility that the security is vulnerable due to the addition of the extension service.

Next, the operation of the image forming device 10 when a plurality of extension services operate in cooperation with each other will be described.

Note, hereinafter, an operation of the image forming device 10 when an extension service for automatically collecting data (hereinafter referred to as "data collection service") operates in cooperation with an extension service for automatically transmitting an e-mail at a specific timing (hereinafter referred to as "mail transmission service") will be described as an example.

First, the operation of the service control unit 320 when the status of the extension service is notified to another extension service will be described.

Figure 6:
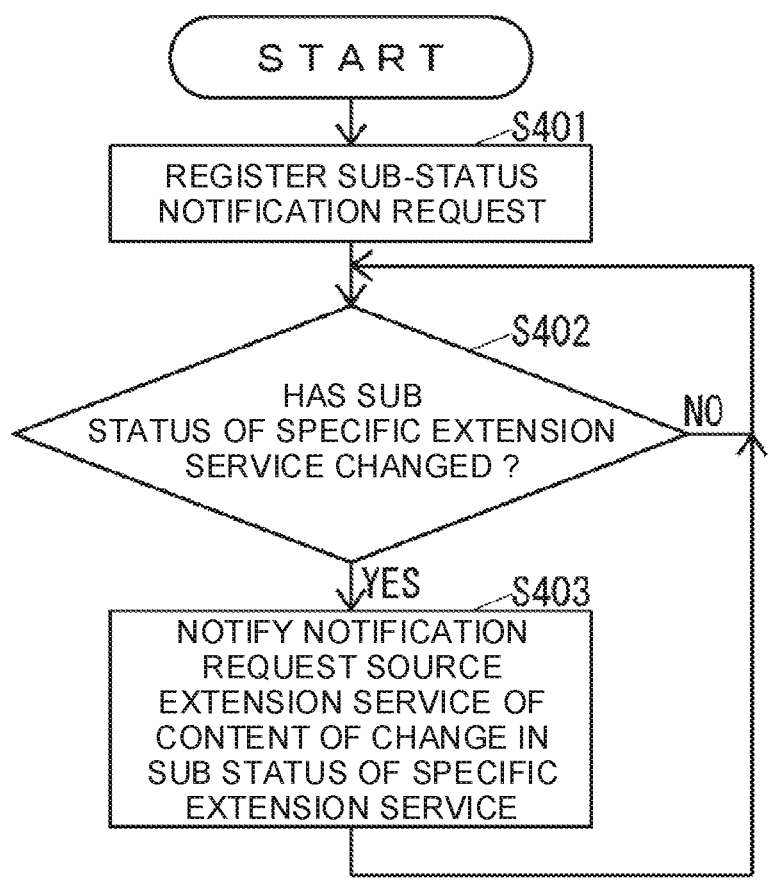
FIG. 6 is a flowchart of the operation of the service control unit illustrated in FIG. 3 when the state of an extension service is notified to another extension service.

FIG. 6 is a flowchart illustrating the operation of the service control unit 320 when the state of the extension service is notified to another extension service.

When the service control unit 320 receives a request to notify a sub status (hereinafter referred to as "sub-status notification request") of an extension service which is special (hereinafter referred to as "specific extension service") from an extension service other than the specific extension service (hereinafter referred to as "notification request source extension service"), the service control unit 320 executes the operation illustrated in FIG. 6.

As illustrated in FIG. 6, the service control unit 320 registers the received sub-status notification request with the service control unit 320 itself (S401).

Next, until the service activation control unit 323 determines in S401 that the sub status of the specific extension service indicated in the sub-status notification request registered in the service control unit 320 has changed, the service activation control unit 323 determines whether the sub status of the specific extension service has changed (S402).

When the service activation control unit 323 determines in S402 that the sub status of the specific extension service has been changed, the service activation control unit 323 notifies the notification request source extension service indicated in the sub-status notification request of the content of the change in the sub status of the specific extension service (S403), and then executes the processing of S402.

Next, the operation of the data collection service will be described.

Figure 7:
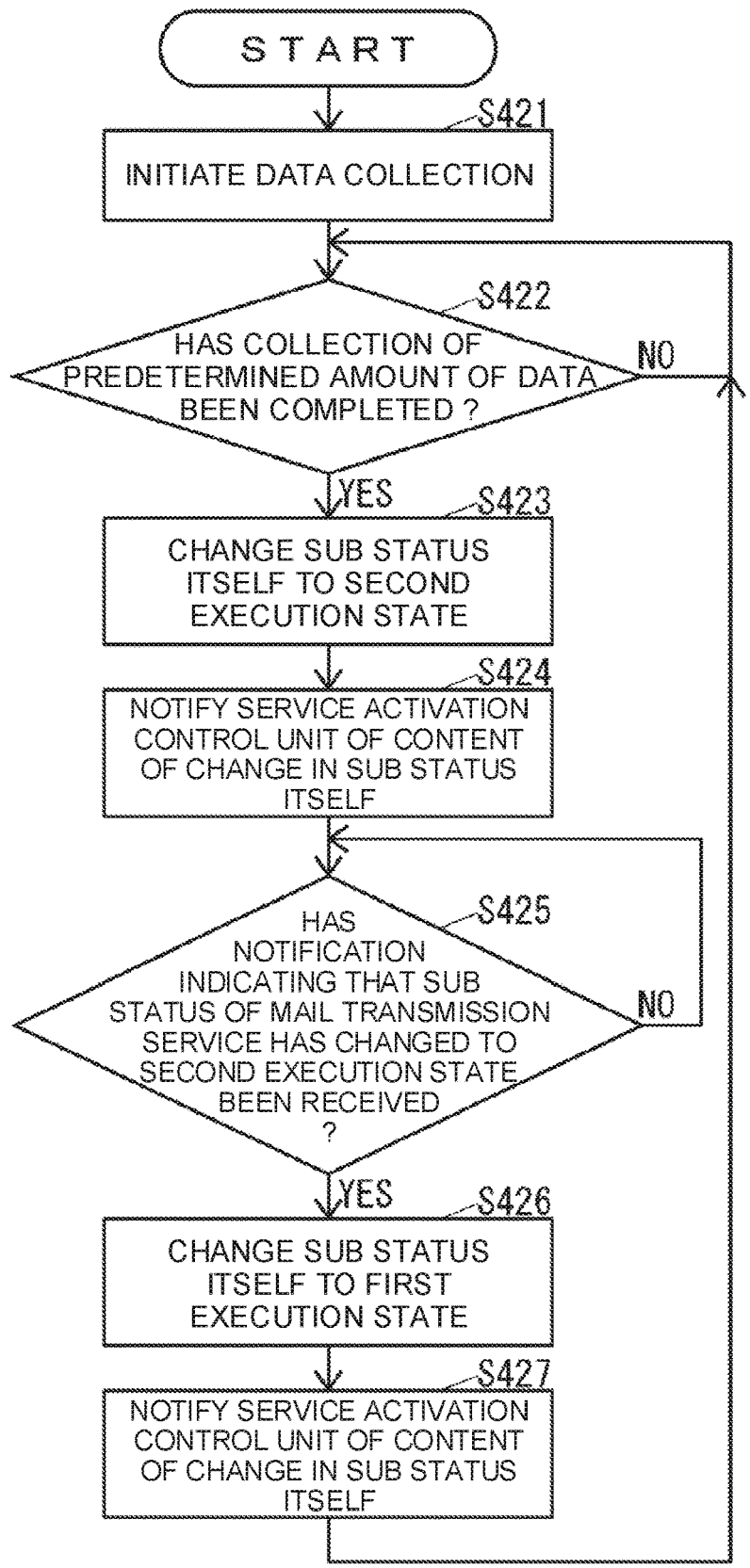
FIG. 7 is a flowchart of the operation of a data collection service as the extension service illustrated in FIG. 2.

FIG. 7 is a flowchart of the operation of the data collection service.

The data collection service can transition as the sub status between a first execution state and a second execution state. The initial state of the sub status of the data collection service is the first execution state. When the state of the sub status is the execution state, the data collection service executes the operation illustrated in FIG. 7.

As illustrated in FIG. 7, the data collection service initiates data collection (S421).

Next, the data collection service determines whether the collection of a certain amount of data has been completed until the data collection service determines that the collection of the certain amount of data has been completed (S422).

When the data collection service determines in S422 that the collection of the certain amount of data has been completed, the data collection service changes the sub status of the data collection service itself from the first execution state to the second execution state (S423), and then notifies the service activation control unit 323 that the sub status of the data collection service itself has changed from the first execution state to the second execution state (S424).

Next, the data collection service determines whether a notification indicating that the sub status of the mail transmission service has changed to the second execution state has been received until the data collection service determines that the notification indicating that the sub status of the mail transmission service has changed to the second execution state has been received (S425).

When the data collection service determines in S425 that the notification indicating that the sub status of the mail transmission service has changed to the second execution state has been received, the data collection service changes the sub status of the data collection service itself from the second execution state to the first execution state (S426), and then notifies the service activation control unit 323 that the sub status of the data collection service itself has changed from the second execution state to the first execution state (S427).

Next, the data collection service executes the processing of S422. After the data collection service determines in S422 that the collection of a certain amount of data has been completed even once, the data collection service determines "a certain amount" in the processing of S422 with respect to the increase from the state determined last time in S422 that the collection of the certain amount of data has been completed.

As illustrated in FIG. 7, in the data collection service, the condition for transitioning from the first execution state to the second execution state is that the collection of the certain amount of data is completed. In the data collection service, the condition for transitioning from the second execution state to the first execution state is to receive the notification indicating that the sub status of the mail transmission service has changed to the second execution state.

Next, the operation of the mail transmission service will be described.

Figure 8:
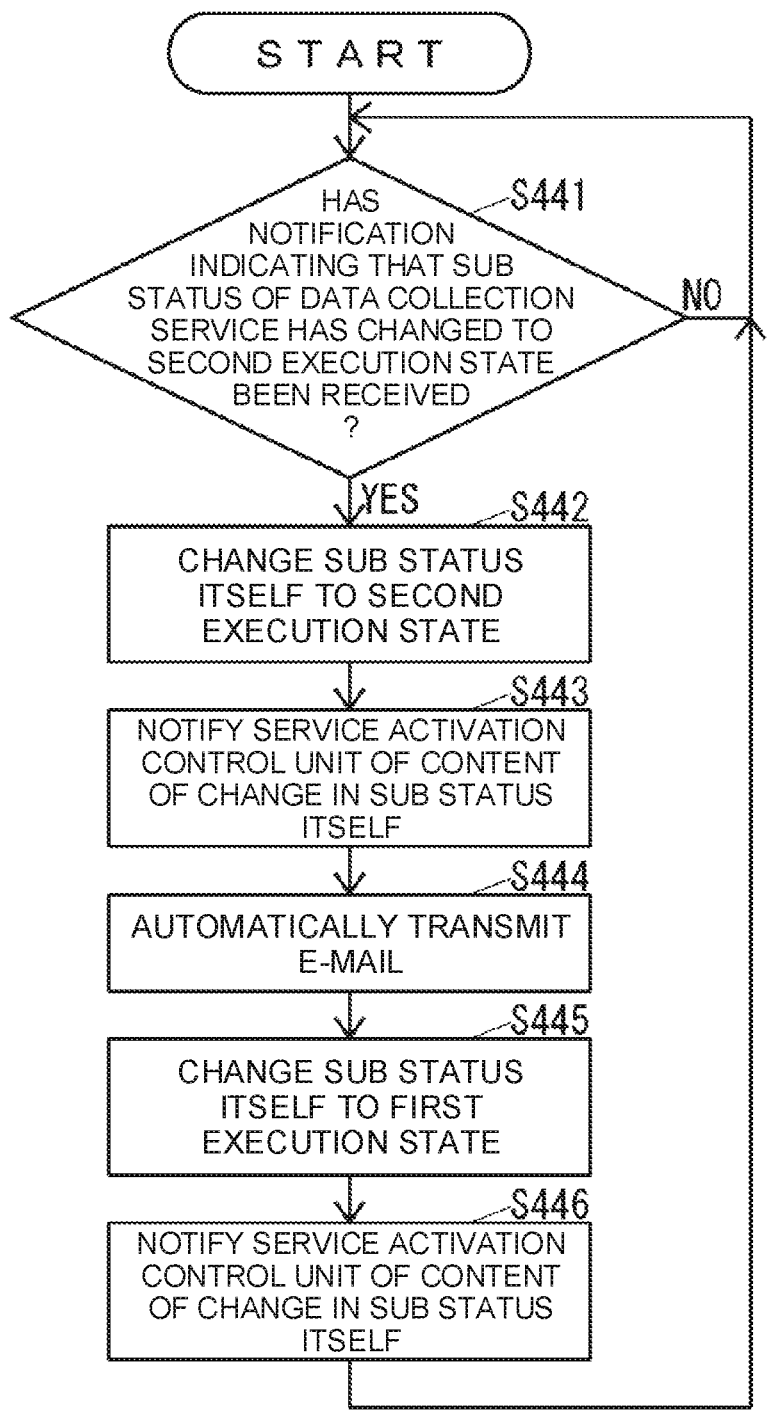
FIG. 8 is a flowchart of the operation of a mail transmission service as the extension service illustrated in FIG. 2.

FIG. 8 is a flowchart illustrating the operation of the mail transmission service.

The mail transmission service can transition as the sub status between the first execution state and the second execution state. The initial state of the sub status of the mail transmission service is the first execution state. When the state of the sub status is the execution state, the mail transmission service executes the operation illustrated in FIG. 8.

As illustrated in FIG. 8, the mail transmission service determines whether the notification indicating that the sub status of the data collection service has changed to the second execution state has been received until the mail transmission service determines that the notification indicating that the sub status of the data collection service has changed to the second execution state has been received (S441).

When the mail transmission service determines in S441 that the notification indicating that the sub status of the data collection service has changed to the second execution state has been received, the mail transmission service changes the sub status of the mail transmission service itself from the first execution state to the second execution state (S442), and then notifies the service activation control unit 323 that the sub status of the mail transmission service itself has changed from the first execution state to the second execution state (S443).

Next, the mail transmission service automatically transmits an e-mail indicating that the work of the data collection service has been completed to a specific destination (S444).

Next, the mail transmission service changes the sub status of the mail transmission service itself from the second execution state to the first execution state (S445), and then notifies the service activation control unit 323 that the sub status of the mail transmission service itself has changed from the second execution state to the first execution state (S446).

Next, the mail transmission service executes the processing of S441.

As illustrated in FIG. 8, in the mail transmission service, the condition for transitioning from the first execution state to the second execution state is to receive the notification indicating that the sub status of the data collection service has changed to the second execution state. In the mail transmission service, the condition for transitioning from the second execution state to the first execution state is to automatically transmit the e-mail indicating that the work of the data collection service has been completed to a specific destination.

Next, the operation of the image forming device 10 when the data collection service operates in cooperation with the mail transmission service will be described.

The service control unit 320 receives a sub-status notification request requesting a notification of the sub status of the mail transmission service (hereinafter referred to as "mail transmission service sub-status notification request") from the data collection service, and then registers the mail transmission service sub-status notification request in the service control unit 320 itself (S401). Further, the service control unit 320 receives a sub-status notification request requesting a notification of the sub status of the data collection service (hereinafter referred to as "data collection service sub-status notification request") from the mail transmission service, and then registers the data collection service sub-status notification request in the service control unit 320 itself (S401). The image forming device 10 executes the operation illustrated in FIG. 9 in a state where the sub-status notification requests are registered in the service control unit 320.

FIG. 9 is a sequence diagram of the operation of the image forming device 10 when the data collection service 180a operates in cooperation with the mail transmission service 180b.

After the data collection service 180a initiates data collection (S421), when the data collection service 180a determines that the collection of a certain amount of data has been completed (YES in S422), the data collection service 180a executes the operation illustrated in FIG. 9.

As illustrated in FIG. 9, the data collection service 180a changes the sub status of the data collection service 180a itself from the first execution state to the second execution state (S423), and then notifies the service activation control unit 323 that the sub status of the data collection service 180a itself changes from the first execution state to the second execution state (S424).

When the service activation control unit 323 is notified that the sub status of the data collection service 180a has changed from the first execution state to the second execution state, the service activation control unit 323 notifies the mail transmission service 180b of the content of the change in the sub status of the data collection service 180a, that is, that the sub status of the data collection service 180a has changed from the first execution state to the second execution state, based on the data collection service sub-status notification request (S403).

When the mail transmission service 180b is notified of the content of the change in the sub status of the data collection service 180a, the mail transmission service 180b changes the sub status of the mail transmission service 180b itself from the first execution state to the second execution state (S442), and then notifies the service activation control unit 323 that the sub status of the mail transmission service 180b itself has changed from the first execution state to the second execution state (S443).

Next, the mail transmission service 180b automatically transmits an e-mail indicating that the work of the data collection service 180a has been completed to a specific destination (S444).

When the service activation control unit 323 is notified that the sub status of the mail transmission service 180b has changed from the first execution state to the second execution state, the service activation control unit 323 notifies the data collection service 180a of the content of the change in the sub status of the mail transmission service 180b, that is, that the sub status of the mail transmission service 180b has changed from the first execution state to the second execution state, based on the mail transmission service sub-status notification request (S403).

When the data collection service 180a is notified of the content of the change in the sub status of the mail transmission service 180b, the data collection service 180a changes the sub status of the data collection service 180a itself from the second execution state to the first execution state (S426), and then notifies the service activation control unit 323 that the sub status of the data collection service 180a itself has changed from the second execution state to the first execution state (S427).

When the service activation control unit 323 is notified that the sub status of the data collection service 180a has changed from the second execution state to the first execution state, the service activation control unit 323 notifies the mail transmission service 180b of the content of the change in the sub status of the data collection service 180a, that is, that the sub status of the data collection service 180a has changed from the second execution state to the first execution state, based on the data collection service sub-status notification request (S403).

When the mail transmission service 180b completes the transmission of the e-mail in S444, the mail transmission service 180b changes the sub status of the mail transmission service 180b itself from the second execution state to the first execution state (S445), and then notifies the service activation control unit 323 that the sub status of the mail transmission service 180b itself has changed from the second execution state to the first execution state (S446).

When the service activation control unit 323 is notified that the sub status of the mail transmission service 180b has changed from the second execution state to the first execution state, the service activation control unit 323 notifies the data collection service 180a of the content of the change in the sub status of the mail transmission service 180b, that is, that the sub status of the mail transmission service 180b has changed from the second execution state to the first execution state, based on the mail transmission service sub-status notification request (S403).

Thereafter, the image forming device 10 repeats the operation illustrated in FIG. 9 every time the data collection service 180a completes to collect the certain amount of data.

As described above, in the image forming device 10, the extension service management unit 190 notifies the mail transmission service 180b of the change in the state of the data collection service 180a (S403), and the mail transmission service 180b, which has been notified of the change in the state of the data collection service 180a from the extension service management unit 190, executes the specific operation (S442 to S446). Further, in the image forming device 10, the extension service management unit 190 notifies the data collection service 180a of the change in the state of the mail transmission service 180b (S403), and the data collection service 180a, which has been notified of the change in the state of the mail transmission service 180b from the extension service management unit 190, executes the specific operation (S422 to S424 and S426 to S427). Therefore, even when the data collection service 180a, which is the extension service, and the mail transmission service 180b, which is the extension service are weekly coupled to each other, the image forming device 10 can operate the data collection service 180a and the mail transmission service 180b in cooperation with each other without changing the specification of the extension service management unit 190, particularly the specification of the service activation control unit 323, for each extension service.

Since the image forming device 10 includes the extension service management unit 190 for managing a plurality of extension services, the image forming device 10 can execute customization using the plurality of extension services. As a result, the image forming device 10 can improve the customizability. For example, the image forming device 10 includes the service providing the function of converting the format of information output from the image forming device 10 from an old type interface format to a new type interface format as the back end service, so that the image forming device 10 can improve the compatibility among an existing system used by the user of the image forming device 10, an existing application used by the user of the image forming device 10, and a cloud service used by the user of the image forming device 10.

Any ones of the plurality of programs in the present embodiment may be configured as one program. For example, the extension program 18c and the extension service program may be configured as one program.

Although the electronic device of the present disclosure is an image forming device in the present embodiments, the electronic device may be an electronic device other than the image forming device such as a personal computer (PC).

What is claimed is:

1. An electronic device, comprising:
    a first extension service and a second extension service which provide, to an extension application which is an application for realizing a function other than a standard function of the electronic device, the function other than the standard function without using a standard application which is an application for realizing the standard function; and
    an extension service management unit which manages the first extension service and the second extension service,
    wherein the extension service management unit notifies the second extension service of a change in the state of the first extension service when the state of the first extension service changes, and
    wherein the second extension service executes a specific operation when the change in the state of the first extension service is notified from the extension service management unit.

2. A computer-readable non-transitory recording medium storing a program, the program causing an electronic device to realize:
    a first extension service and a second extension service which provide, to an extension application which is an application for realizing a function other than a standard function of the electronic device, the function other than the standard function without using a standard application which is an application for realizing the standard function; and
    an extension service management unit which manages the first extension service and the second extension service,
    wherein the extension service management unit notifies the second extension service of a change in the state of the first extension service when the state of the first extension service changes, and
    wherein the second extension service executes a specific operation when the change in the state of first extension service is notified from the extension service management unit.

* * * * *